United States Patent [19]
Motoyama et al.

[11] Patent Number: 5,383,138
[45] Date of Patent: Jan. 17, 1995

[54] FOLDING PORTABLE DATA PROCESSING APPARATUS WITH THREE HINGE POINTS

[75] Inventors: Hideyuki Motoyama; Seiichi Iwasa; Isao Kawamura, all of Kawasaki, Japan

[73] Assignee: Fujitsu Limited, Kawasaki, Japan

[21] Appl. No.: 88,331

[22] Filed: Jul. 9, 1993

[30] Foreign Application Priority Data

Jul. 13, 1992 [JP] Japan .................................. 4-185371

[51] Int. Cl.⁶ .................................................. G06F 1/00
[52] U.S. Cl. .................................. 364/708.1; 361/683
[58] Field of Search ........................ 364/708.1; 361/679, 361/683

[56] References Cited

U.S. PATENT DOCUMENTS

| | | | |
|---|---|---|---|
| 4,571,456 | 2/1986 | Paulsen et al. | 179/2 |
| 4,589,659 | 5/1986 | Yokoi et al. | 273/1 |
| 4,851,812 | 7/1989 | Holmberg | 364/708.1 |
| 4,959,887 | 10/1990 | Gruenberg | 364/708.1 |
| 5,260,885 | 11/1993 | Ma | 364/708.1 |
| 5,268,817 | 12/1993 | Miyagawa et al. | 361/679 |
| 5,278,779 | 1/1994 | Conway et al. | 364/708.1 |

FOREIGN PATENT DOCUMENTS

| | | |
|---|---|---|
| 52-34644 | 3/1977 | Japan . |
| 55-66044 | 5/1980 | Japan . |
| 55-66047 | 5/1980 | Japan . |
| 59-91524 | 5/1984 | Japan . |
| 60-160418 | 8/1985 | Japan . |
| 3-240115 | 10/1991 | Japan . |
| 3-278214 | 12/1991 | Japan . |

*Primary Examiner*—David H. Malzahn
*Attorney, Agent, or Firm*—Armstrong, Westerman Hattori, McLeland & Naughton

[57] ABSTRACT

A portable data processing apparatus such as a personal computer comprising in series a base portion, a top cover portion, a display housing portion, and a keyboard portion. These portions are pivotally connected one after another by first, second and third hinge means, respectively. The first, second and third hinge means are parallel to each other, so that the apparatus can adopt a spread position in which the keyboard portion and the display housing portion are spread to the front and a retracted position in which the keyboard portion overlaps the display housing portion. The top cover portion, the display housing portion, the keyboard portion, and the base portion are folded in a face-to-face relationship in the retracted position.

31 Claims, 14 Drawing Sheets

FOLDING PORTABLE DATA PROCESSING APPARATUS WITH THREE HINGE POINTS

BACKGROUND OF THE INVENTION

1. Field of the Invention

The present invention relates to a folding portable data processing apparatus such as a personal computer, and in particular, it relates to a data processing apparatus having a retracted portable position and a spread use position.

2. Description of the Related Art

Recently, with increasing improvements in data processing apparatuses, there is a demand to carry data processing apparatuses, such as personal computers and word processors, and for a person to be able to use the same anywhere. In particular, a demand is increasing for a data processing apparatus which is not only small in size, light in weight, and portable, but is also easy to operate and is inexpensive.

One conventionally known portable data processing apparatus is a so-called book-type which comprises two foldable portions, i.e., a base portion and a display housing portion. A display such as a liquid crystal display is arranged on the inner surface of the display housing portion, and a keyboard is arranged on the upper surface of the base portion. When the apparatus is used, the display housing portion is opened to reveal the display and the keyboard. Such a book-type structure is disclosed, for example, in U.S. Pat. No. 4,571,456.

The portable computer disclosed in this conventional device comprises a base portion, a display housing portion pivotally attached the base portion by a hinge means at an intermediate position between the front and the rear of the base portion; and a rear cover portion attached on the base behind the display housing portion to form an additional housing. The display housing portion is pivotable from a closed latched position on the base portion to an erect position for viewing the display. The hinge means for pivotally connecting the display housing portion to the base portion is located at the central region of the base portion between the opposite lateral sides of the base portion, and the display housing portion is opened upwardly and rather rearwardly to a rearwardly tilted position so that the display on the inner surface of the display housing portion can be seen by an operator and the keyboard arranged on the upper surface of the base portion is simultaneously revealed.

The conventional structural arrangement or a structural arrangement similar thereto is used in many currently sold portable data processing apparatuses, but this does not mean that it is without problems.

First, in the conventional apparatuses, it is necessary to arrange many wires to connect the printed circuit in the computer unit in the base portion to the display such as a liquid crystal display. In the conventional structure, the display housing portion is opened upwardly and rather rearwardly to a rearwardly tilted position, so that the rotating angle of the display housing portion relative to the base portion is approximately 170 degrees. Therefore, in order to avoid damaging the wires due to repeated bending and stretching motions occurring with the opening and closing action of the display housing portion, an axial cavity is provided in the interior of the inner pin member of the hinge means along the central longitudinal axis thereof, and the wiring is axially passed through the axial cavity in the inner pin member of the hinge means. Conventional covered multicore cables are used for the wiring, or alternatively, a flexible printed wiring board comprising a polyimide base sheet may be used for the wiring. This is described in the above described United States patent.

Considering an actual mass-production of portable data processing apparatuses at the factory, the conventional structure in which the wirings are passed through the axial cavity in the inner pin member of the hinge means includes a number of drawbacks. First, many wires must be extended from the printed circuit in the computer unit in the base portion to the display in the display housing portion, as described above, but the step of inserting many wires through the axial cavity in the inner pin member of the hinge means cannot be easily done by an automated manufacturing process and the efficiency of the assembly work of the apparatus is low. The efficiency is also low when flexible printed wiring boards are used because the flexible printed wiring boards must be carefully handled so that they are not folded.

Secondly, it is difficult to make the structure having the axial cavity in the inner pin member of the hinge means with sufficient strength. In many cases when the apparatuses are roughly handled in the field, the hollow pin member of the hinge means may be damaged. Further, even though the hinge means is not actually damaged, when the action of the hinge means is not smooth, a part of the flexible printed circuit board may be scratched in the axial cavity in the inner pin member of the hinge means and a crack may occur at a part of the wiring pattern of the flexible printed wiring board due to repeated opening and closing of the display housing portion. These problems results from the structural arrangement in which the display housing portion must be rotated relative to the base portion by 170 degrees.

Further, in operating the keyboard for inputting information, it is recognized as desirable to arrange the keyboard so that the rear of the keyboard, viewed by the operator, is higher than the front of the keyboard. However, in the book type structure, the upper surface of the keyboard is generally horizontal. In order set the keyboard so that the rear of the keyboard is higher than the front of the keyboard, it is necessary to attach legs to the rear of the base portion to raise the rear of the bottom surface of the base portion. It is possible in principle to tilt the keyboard to the front in this manner, but a drawback exists in this method when the keyboard is actually used. Since the legs are located below the bottom surface of the apparatus and usually cannot be seen, there may be a case where the apparatus may be moved carelessly by mistake, which may result in that the legs touching and spilling beverage containers on a desk, or the legs touching the corner of the desk and the legs themselves being damaged. In addition, the length of the legs is usually constant, and it is not possible, as an option, to change the tilt angle of the keyboard as desired.

SUMMARY OF THE INVENTION

The object of the present invention is to solve the problems of the above described conventional structural arrangement and to provide a portable data processing apparatus which is easy to assemble and comfortable to handle.

According to the present invention, there is provided a portable data processing apparatus comprising a base portion adapted to be rested on a support surface and having a front and a rear, a top cover portion pivotally connected to the base portion by a first hinge means; a display housing portion having a display and pivotally connected to the top cover portion by a second hinge means; and a keyboard portion pivotally connected to the display housing portion by a third hinge means. The first, second and third hinge means have respective hinge axes parallel to each other so that the apparatus can adopt a spread position in which the keyboard portion and the display housing portion are spread to the front with the third hinge means moved away from the first hinge means, and a retracted position in which the keyboard portion overlaps the display housing portion with the third hinge means moved close to the first hinge means.

By arranging the apparatus to include the base, top cover, display housing and keyboard portions pivotally connected one after another by three hinge means, it is possible to minimize the range of the relative rotating angle of the pivotally connected portions through which wiring passes from the base portion to the display housing portion, or from the top cover portion to the display housing portion, compared to the conventional structural arrangement whereby the display housing portion is pivotally connected to the base portion by only one hinge means. For example, it is possible to provide a structural arrangement such that the relative rotating angle of the pivotable connected portions is within the range of 90 degree, which is approximately a half of that of the prior art. Accordingly, it is not necessary to provide the hinge means with a hollow pin structure; and thus, it is possible to simplify the assembling step by adopting a simple and strong hinge means and to make the electrical connection by flat wiring. Also, in the use of the apparatus, the keyboard portion is drawn from the base portion, accompanying the pivotal motion of the keyboard portion, and it is possible to change the tilting angle of the keyboard portion in response to a degree of drawing or pulling of the keyboard portion from the base portion.

Preferably, the base portion, the top cover portion, the display housing portion and the keyboard portion have generally flat shapes and can be collapsed in a face-to-face relationship in said retracted position, and preferably, the top cover portion, the display housing portion and the keyboard portion have respective first and second ends, the first end of the top cover portion being pivotally connected to the base portion at a position remote from the front, the second end of the top cover portion being pivotally connected to the first end of the display housing portion, the second end of the display housing portion being pivotally connected to the first end of the keyboard portion.

Preferably, the base portion includes a main printed-wiring board including a main control circuit for data processing and the display housing portion includes electric components for displaying, electric wiring means extending from the main printed wiring board through the top cover portion to the electric components to interconnect the main printed wiring board to the electric components. In this case, the electric wiring means preferably extends from the second end of the top cover portion to the first end of the display housing portion at a position other than a position where the second hinge means is located.

Preferably, at least one of the first, second and third hinge means comprises a cylindrical projection arranged in one of the pivotally connected portions and a cylindrical cavity arranged in the other of the pivotally connected portions and adapted to be fitted with the cylindrical projection.

BRIEF DESCRIPTION OF THE DRAWINGS

The other objects and advantages of the present invention will become more apparent from the following description of the preferred embodiments, with reference to the accompanying drawings, in which.

DESCRIPTION OF THE PREFERRED EMBODIMENTS

Figure 1:
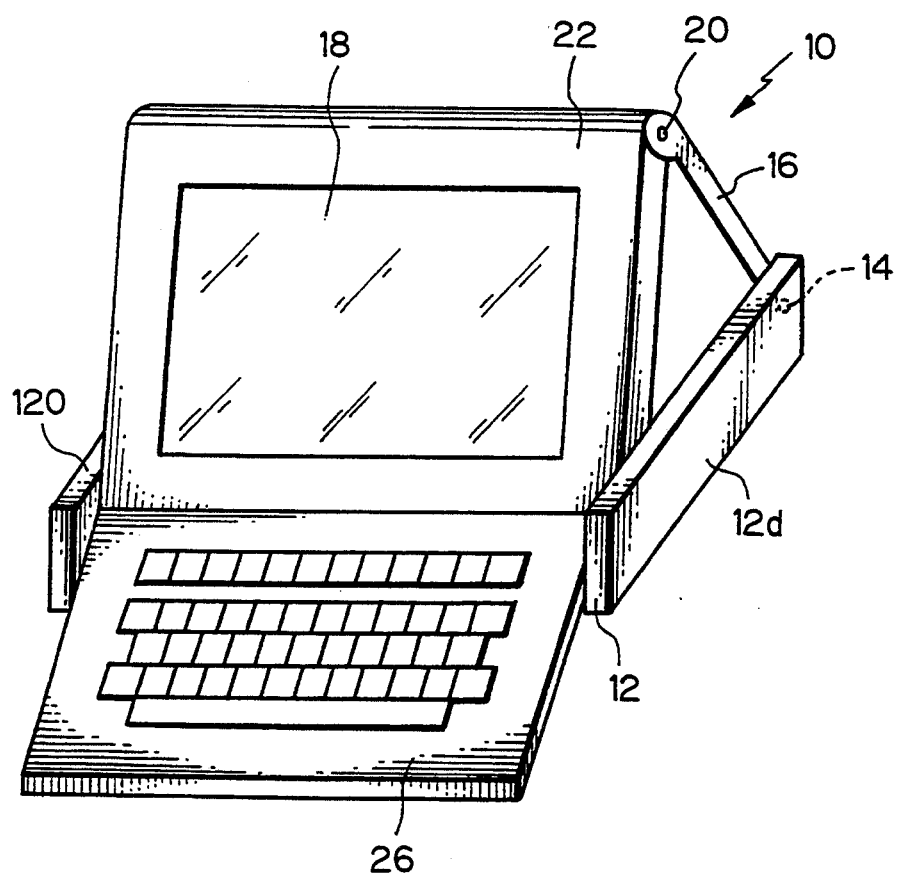
FIG. 1 is a perspective view of a portable data processing apparatus according to the first embodiment of the present invention.
Figure 2:
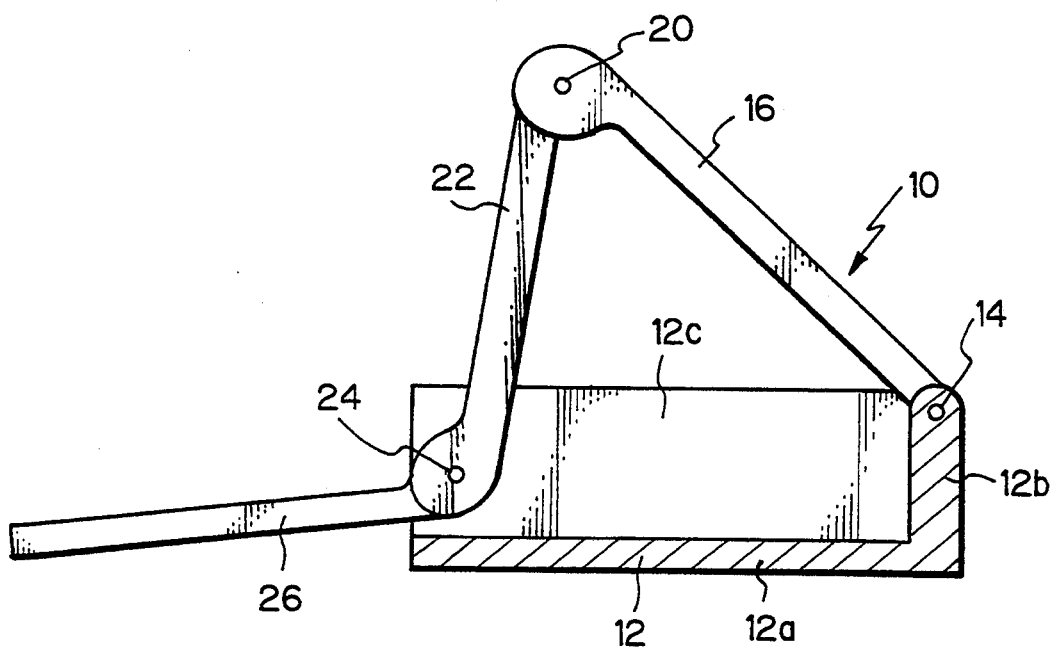
FIG. 2 is a side cross-sectional view of the apparatus of FIG. 1 in a spread position.
Figure 3:
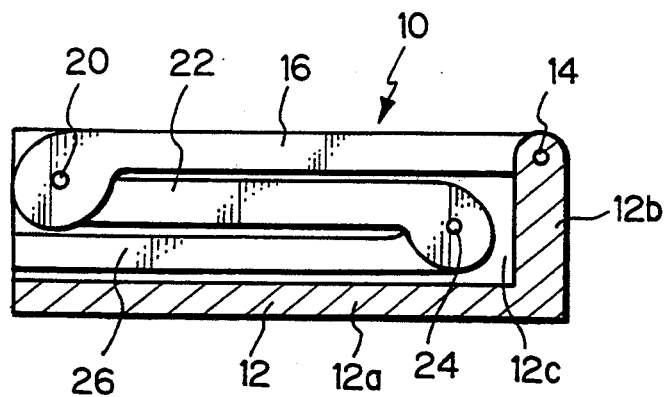
FIG. 3 is a side cross-sectional view of the apparatus of FIG. 1 in a retracted position.

FIGS. 1 to 3 show a portable data processing apparatus 10 according to the first embodiment of the present invention, in which FIG. 1 is a perspective view of the entire apparatus 10; FIG. 2 is a side cross-sectional view of the apparatus 10 of FIG. 1 in a spread or open position for use; and FIG. 3 is a side cross-sectional view of the apparatus 10 in a retracted or closed position for transportation.

The apparatus 10 comprises a base portion 12 adapted to be rested on a support surface such as an upper surface of a desk; a top cover portion 16 pivotally connected to the base portion 12 by a first hinge means 14; a display housing portion 22 having a display 18 and pivotally connected to the top cover portion 16 by a second hinge means 20; and a keyboard portion 26 pivotally connected to the display housing portion 22 by a third hinge means 24.

The first, second and third hinge means 14, 20, and 24 have respective hinge axes extending transversely to the apparatus 10 and parallel to each other. The front of the base portion 12, and thus of the apparatus 10 is shown on the left side of FIGS. 1 to 3, and the rear is shown on the right side thereof. The display 18 and the keyboard can be seen from the front.

The base portion 12 is shaped in a rectangular box with the top and front sides opened; and thus has a flat base wall 12a, a rear wall 12b standing on the base wall 12a, and opposite lateral side walls 12c and 12d also standing on the base wall 12a at the lateral ends of the base wall 12a. The top cover portion 16, the display housing portion 22 and the keyboard portion 26 have generally flat rectangular shapes and can be collapsed in a face-to-face relationship in the retracted position. The keyboard portion 26 and the display housing portion 22 can be housed between the side walls 12c and 12d in the retracted position.

The first hinge means 14 comprises two hinges located on the top of the lateral side walls 12c and 12d or the rear wall 12b of the base portion 12 and the opposite lateral ends of the base portion 12. Each of the hinges of the first, second and third hinge means 14, 20, and 24 comprises a cylindrical projection (pin) arranged in one of the pivotally connected portions and a cylindrical cavity arranged in the other of the pivotally connected portions and adapted to be fitted with the cylindrical projection.

One of the projections and the cavities of the first hinge means 14 is arranged, as described above, and the other projection and cavities of the first hinge means 14 arranged on the rear end of the top cover portion 16 and the lateral end of the top cover portion 16. The second hinge means 20 comprises two hinges located on the front end of the top cover portion 16 and the lateral ends of the top cover portion 16, and on the rear end of the display housing portion 22 and the lateral ends of the display housing portion 22. Similarly, the third hinge means 24 comprises two hinges located on the rear end of the display housing portion 22 and the lateral ends of the display housing portion 22, and on the rear end of the keyboard portion 26 and the lateral ends of the keyboard portion 26.

The apparatus 10 can hold the spread position in which the keyboard portion 26 and the display housing portion 22 are spread to the front with the third hinge means 24 moved away from the first hinge means 14, as shown in FIGS. 1 and 2, and the retracted position in which the keyboard portion 26 overlaps the display housing portion 22 with the third hinge means 24 moved close to the first hinge means 14, as shown in FIG. 3. In the retracted position, the base portion 12, the top cover portion 16, the display housing portion 22, and the keyboard portion 26 are collapsed one above another in a face-to-face relationship; and thus, the apparatus 10 can be put away in a compact structure.

In this manner, the apparatus 10 of the present invention includes the structural arrangement such that the base, top cover, display housing and keyboard portions 12, 16, 22, and 26 are pivotally connected one after another by three hinge means 14, 20, and 24, while the conventional structural arrangement includes only one hinge means and the range of the relative rotating angle of the pivotally connected portions is relatively large. When the apparatus is closed into the retracted position for transportation, the keyboard portion 26 is slidably pushed to the rear of the apparatus, and the keyboard portion 26 is stored on the base portion 12, the display housing portion 22 is overlapped above the keyboard portion 26 and in turn the top cover portion 16 is overlapped above the display housing portion 22, so that the top cover portion 16 functions as an outer case for the entire apparatus. When the apparatus is opened into the spread position for use, the keyboard portion 26 is slidably drawn to the front of the apparatus, as shown in FIGS. 1 and 2. In the spread position where the keyboard portion 26 is drawn, the rear part of the keyboard portion 26 rests on the base portion 12 and the front part of the keyboard portion 26 rests on the desk, and thus it is possible to use the keyboard in the forwardly tilted position in which the front of the keyboard is lower than the rear of the keyboard.

In the above described structure, the relative rotating angle of the pivotally connected top cover and display housing portions 16 and 22 is at most within the range of 90 degrees, and generally within the range of 70 degrees, which is approximately a half or lower than a half of that of the hinge means connected display and base portions of the prior art.

In this manner, it is possible to arrange the wiring, such as cables, extending from the base portion 12 through the top cover portion 16 to the display housing portion 22 without any special consideration of the bend at the second hinge means 20 because the relative angle of the pivotally connected top cover and display housing portions 16 and 22 is within the range of 70 degrees. Accordingly, it is not necessary to provide the hinge means with a hollow pin structure which was necessary in the conventional structural arrangement; and thus, it is possible to simplify the assembly step by adopting a simple and strong hinge means and to easily realize an automated assembly process for the wiring in the apparatus 10, resulting in a reduction of the manufacturing cost. It is possible to use any type of wiring, such as a bundle of multicore cables, flat cables, or a flexible printed wiring board. Also, it is not limited to use the hinge means of the illustrated embodiment, but it is possible to use the hinge means of any type of structures which pivotally connects two portions.

Figure 4:
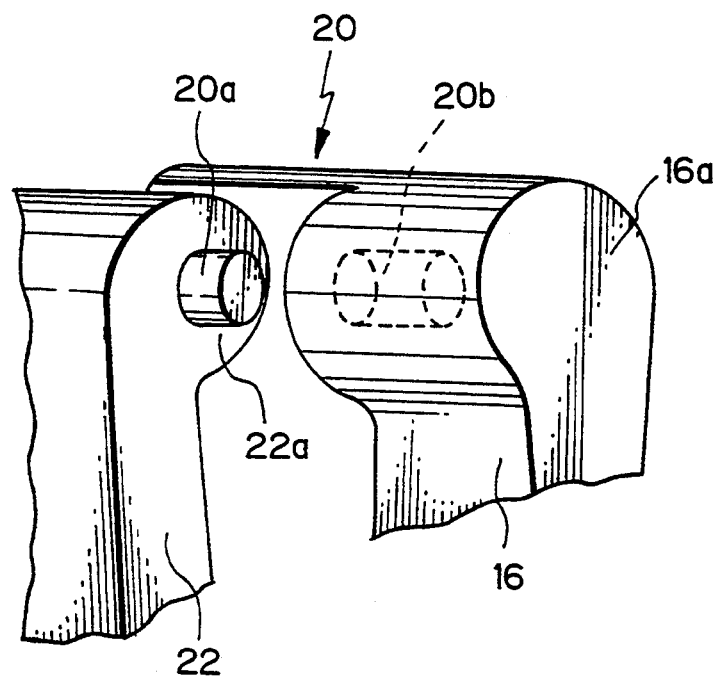
FIG. 4 is a partially enlarged perspective view of one of the hinges of FIG. 1.

FIG. 4 shows an example of the structure of the second hinge means 20. The second hinge means 20 comprises a cylindrical projection 20a arranged on the side surface of a tab 22a of the display housing portion 22 and a cylindrical cavity 20b arranged in the side surface of a tab 16a of the top cover portion 16 and adapted to be fitted with the cylindrical projection 20a. The first and second hinge means 14 and 20 can have a structure similar to this.

Figure 5:
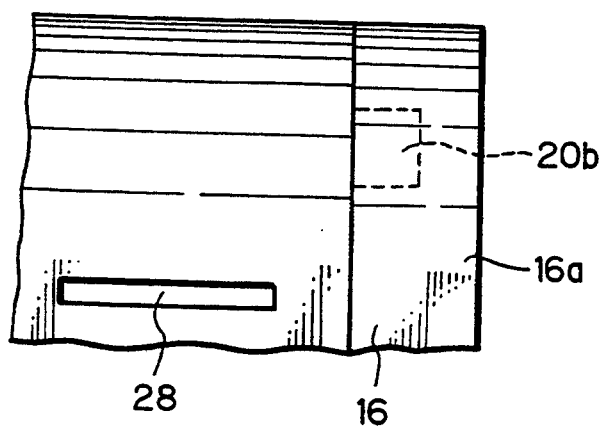
FIG. 5 is a front view of a portion of the top cover portion of the second hinge of FIG. 4, viewed from the display housing portion of FIG. 4.

FIG. 5 is a partial front view of the top cover portion 16, which has the cylindrical cavity 20b arranged in the side surface of a tab 16a of the top cover portion 16, as described with reference to FIG. 4, and an opening 28 at a position offset from the hinge axis of the second hinge means 20 and slightly displaced from the cylindrical cavity 20b.

Figure 6:
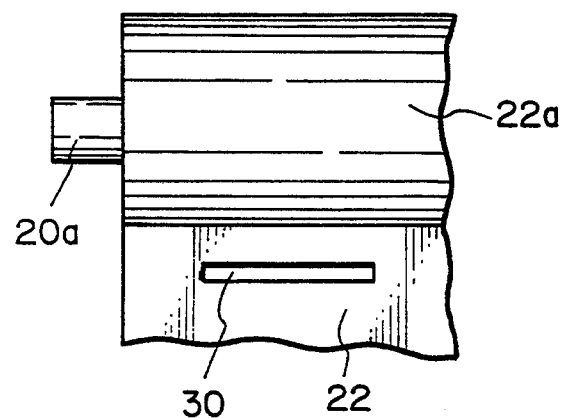
FIG. 6 is a rear view of the display housing portion of the second hinge of FIG. 4, viewed from the top cover portion of FIG. 4.

FIG. 6 is a rear view of the display housing portion 22 of the second hinge of FIG. 4, as viewed from the top cover portion 16 of FIG. 4. The display housing portion 22 has the cylindrical projection 20a arranged on the side surface of a tab 22a of the display housing portion 22, as described with reference to FIG. 4, and an opening 30 at a position offset from the hinge axis of the second hinge means 20 and slightly displaced from the cylindrical projection 20a. The opening 28 of the top cover portion 16 and the opening 30 of the display housing portion 22 is positioned such that the opening 30 faces the opening 28 of the top cover portion 16 in the assembled condition.

Figure 7:
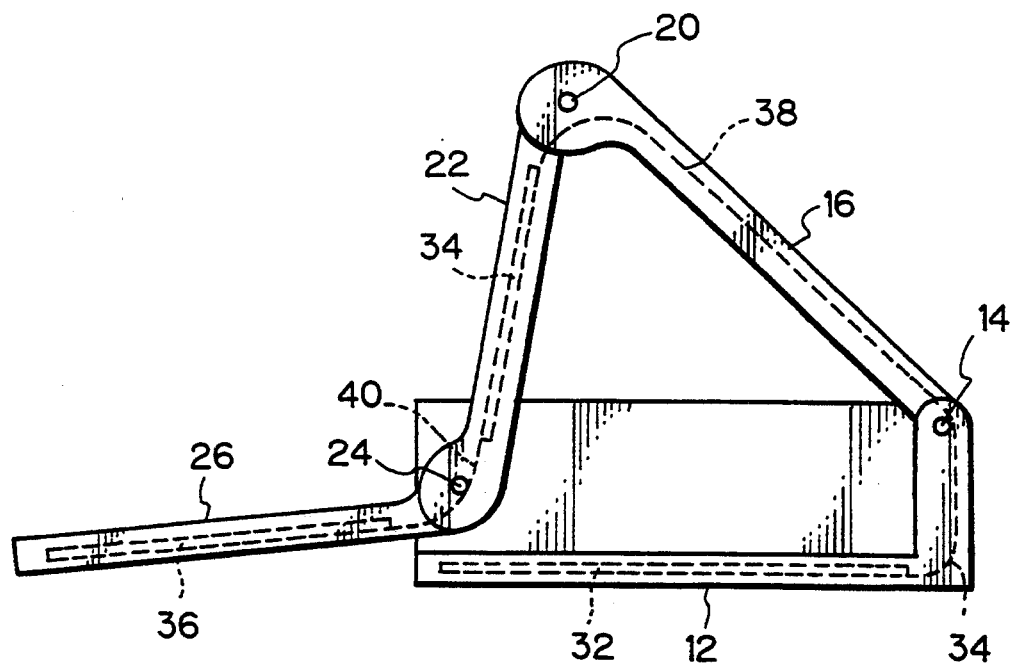
FIG. 7 is a diagrammatic side view of the apparatus of FIG. 1, illustrating the wiring of FIG. 1.

FIG. 7 is a diagrammatic side view of the apparatus 10 of FIG. 1, illustrating the wiring of FIG. 1. The base portion 12 includes a main printed wiring board 32 including a main control circuit with a central processing unit (CPU) and/or a peripheral control circuit for data processing. The display housing portion 22 includes electric components such as a printed wiring board 34 for displaying of the liquid crystal display panel, and the keyboard portion 26 includes a printed wiring board 36. Wirings 38 extend from the main printed wiring board 32 in the base portion 12 through the top cover portion 16 to the printed wiring board 34 in the display housing portion to electrically interconnect the main printed wiring board 32 to the printed wiring board 34. The wiring 38 passes through the pivotal connections of the base portion 12, the top cover portion 16, and the display housing portion 22. The details of the wiring 38 passing through the connection between the top cover portion 16 and the display housing portion 22 are shown in FIGS. 8 and 9.

Figure 8:
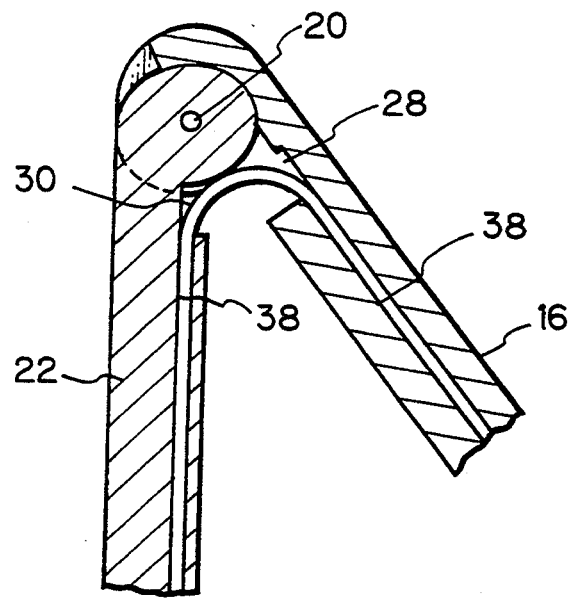
FIG. 8 is a cross-sectional view of the second hinge and the wiring of FIG. 7.
Figure 9:
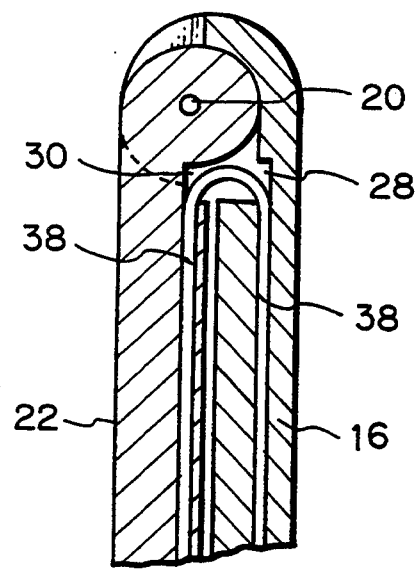
FIG. 9 is a cross-sectional view of the second hinge and the wirings near the second hinge in the retracted position.

FIG. 8 shows the portable data processing apparatus 10 in the spread position and in use, while FIG. 9 shows the apparatus 10 in the retracted position. In FIGS. 8 and 9, the opening 30 faces the opening 28 of the top cover portion 16 but the openings 28 and 30 are positioned at a position other than a position where the second hinge means 20 is located (see FIGS. 5 and 6). The wirings 38 pass through an internal passage arranged in the top cover portion 16 in register with the opening 28 and an internal passage arranged in the display housing portion 22 in register with the opening 30. Accordingly, it is not necessary to provide a hollow structure in the second hinge means 20 to pass the wirings 38 therethrough. This is also applied to the first hinge means 14.

The length of the wirings 38 extending from the main printed wiring board 32 to the printed wiring board 34 in the display housing portion 22 may be elongated to some extent, compared with the prior art structure, but there is no problem of, e.g., noise, because the top cover portion 16 can be shielded from the noise by plating or else. Further relatively simple wirings 40 extend from the display housing portion 22 to the keyboard portion 26. An interface corresponding to RS-232C is usually used for the wirings 40, and there in no problem of the length and the bending in the wirings 40.

Figure 10:
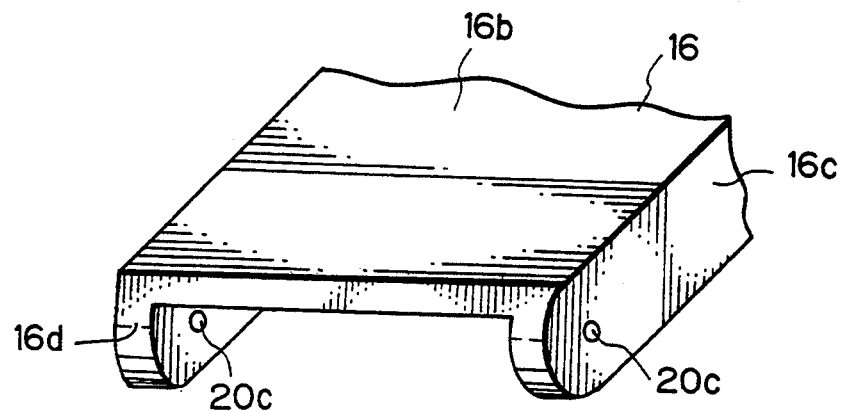
FIG. 10 is a perspective view of a part of the top cover portion according to the second embodiment of the present invention.
Figure 11:
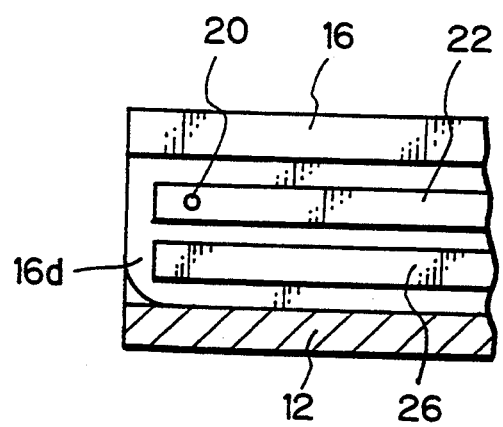
FIG. 11 is a side cross-sectional view of the apparatus including the top cover portion of FIG. 10 in a retracted position.

FIGS. 10 and 11 show the second embodiment of the present invention. The portable data processing apparatus 10 of this embodiment comprises, similar to the previous embodiment, a base portion 12 adapted to be rested on a support surface; a top cover portion 16 pivotally connected to the base portion 12 by a first hinge means 14 (not shown in FIGS. 10 and 11); a display housing portion 22 having a display and pivotally connected to the top cover portion 16 by a second hinge means 20; and a keyboard portion 26 pivotally connected to the display housing portion 22 by a third hinge means 24 (not shown in FIGS. 10 and 11).

In this embodiment, the top cover portion 16 comprises a flat base wall 16b, and opposite side walls 16c and 16d depending from the lateral ends of the base wall 16b. The side walls 16c and 16d have cylindrical cavities (or cylindrical projections) 20c of the second hinge means 20 and cylindrical projections (not shown) of the second hinge means 20 engaging with the cylindrical cavities 20c are arranged on the display housing portion 22. The bottom of the side walls 16c and 16d rest on the surface of the base portion 12, so that the keyboard portion 26 and the display housing portion 22 can be housed between the side walls 16c and 16d in the retracted position.

Figure 12:
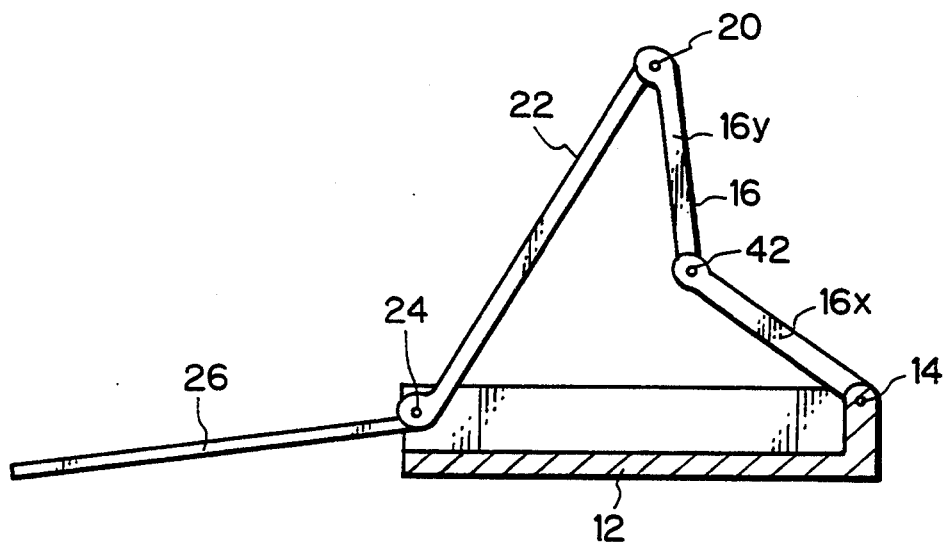
FIG. 12 is a side cross-sectional view of the apparatus according to the third embodiment of the present invention.

FIG. 12 shows the third embodiment of the present invention. The portable data processing apparatus 10 of this embodiment comprises, similar to the previous embodiments, a base portion 12 adapted to be rested on a support surface; a top cover portion 16 pivotally connected to the base portion 12 by a first hinge means 14; a display housing portion 22 having a display and pivotally connected to the top cover portion 16 by a second hinge means 20; and a keyboard portion 26 pivotally connected to the display housing portion 22 by a third hinge means 24.

In this embodiment, the top cover portion 16 is bendable at a fourth hinge means 42 having a hinge axis parallel to the pivot axes of the first, second and third hinge means 14, 20 and 24. That is, the top cover portion 16 comprises a first part 16x and a second part 16y pivotally connected to the first part 16x by the fourth hinge means 42.

In the first embodiment, the tilting angle of the display housing portion 22 is constant in the condition where the keyboard portion 26 is in the fully drawn position, as shown in FIG. 2, and it is impossible to tilt the display housing portion 22 beyond the constant angle. In the third embodiment, it is possible to adjust the tilting angle in the condition where the keyboard portion 26 is in the fully drawn position, by arranging the fourth hinge means 42 in the top cover portion 16.

Figure 13:
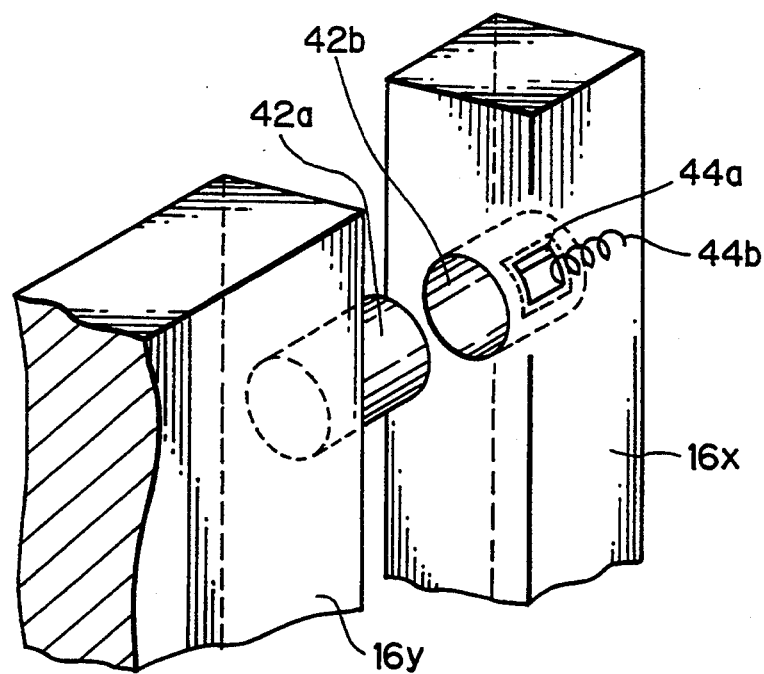
FIG. 13 is a perspective view of the friction increasing means of the fourth hinge of FIG. 12.

As shown in FIG. 13, the fourth hinge means 42 comprises a cylindrical projection 42a and a cylindrical cavity 42b engageable with the cylindrical projection 42a. A friction increasing means is provided for preventing the rotating parts from freely rotating, unless a large force is applied to the fourth hinge means 42 or to the other portions of the apparatus. In this embodiment, the friction increasing means comprises a friction piece 44a arranged in an open area in the cylindrical cavity 42b to be frictionally engaged with the cylindrical projection 42a, and a spring 44b for biasing the friction piece 44a to the cylindrical projection 42a. It is possible to ensure that the first and second parts 16x and 16y are maintained at a desired angular relationship, by the provision of the friction increasing means.

Figure 14:
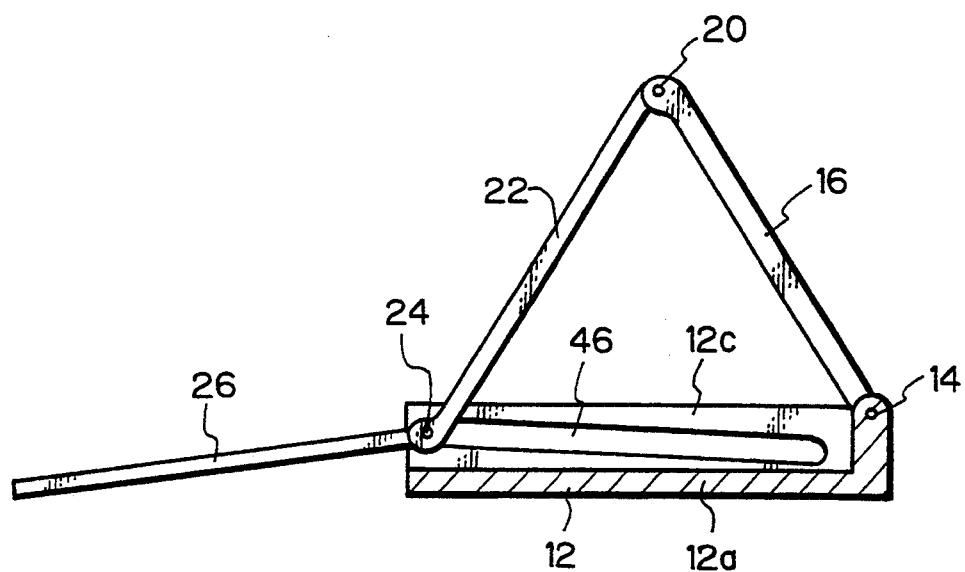
FIG. 14 is a side cross-sectional view of the apparatus according to the fourth embodiment of the present invention.
Figure 15:
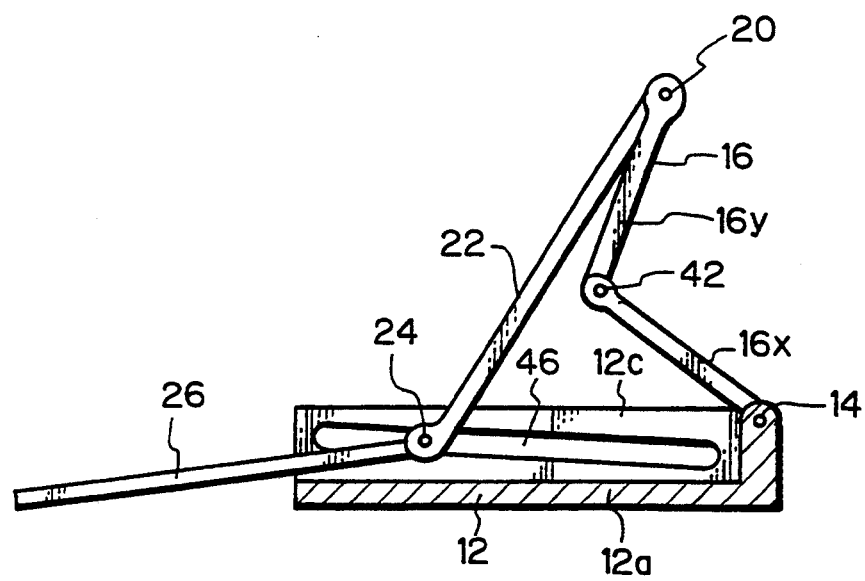
FIG. 15 is a side cross-sectional view of the apparatus according to the fifth embodiment of the present invention.

FIG. 14 shows the fourth embodiment of the present invention and FIG. 15 shows the fifth embodiment of the present invention. In each of these embodiments, the portable data processing apparatus 10 of this embodiment comprises, similar to the previous embodiments, a base portion 12 adapted to be rested on a support surface, a top cover portion 16 pivotally connected to the base portion 12 by a first hinge means 14, a display housing portion 22 having a display and pivotally connected to the top cover portion 16 by a second hinge means 20, and a keyboard portion 26 pivotally connected to the display housing portion 22 by a third hinge means 24. As in the embodiment shown in FIG. 12, the top cover portion 16 in FIG. 15 is bendable at a fourth hinge means 42.

In FIGS. 14 and 15, the base portion 12 is shaped in a rectangular box with the top and front sides opened, and thus has a flat base wall 12a and opposite lateral side walls 12c (only one shown in FIGS. 14 and 15), as previously described. A part of the keyboard portion 26 can slide along at least one of the side walls 12c of the base portion 12 in the direction from the front to the rear or from the rear to the front, whereby it is possible to change the tilting angle of the keyboard portion 26 in response to the degree of drawing the keyboard portion 26 from the base portion 12.

Figure 16:
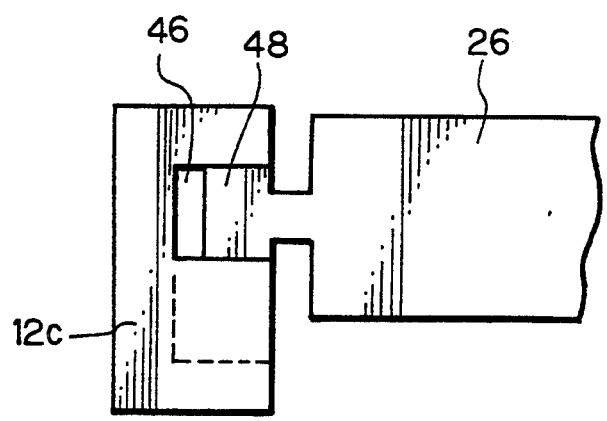
FIG. 16 is a view illustrating the guide groove in the side wall of the base portion and the slider of the keyboard.

To this end, a guide groove 46 is provided in at least one of the side walls 12c of the base portion 12, and the keyboard portion 26 has a slider 48 (FIG. 16) slidably engaging in the guide groove 46. The guide groove 46 is cut to the depth in the range of 1 to 5 millimeters depending on the thickness of the side wall 12c of the base portion 12; and the inner surface of the guide groove 46 is smooth to some extent so that the slider 48 can slide along the inner surface of the guide groove 46.

Figure 17:
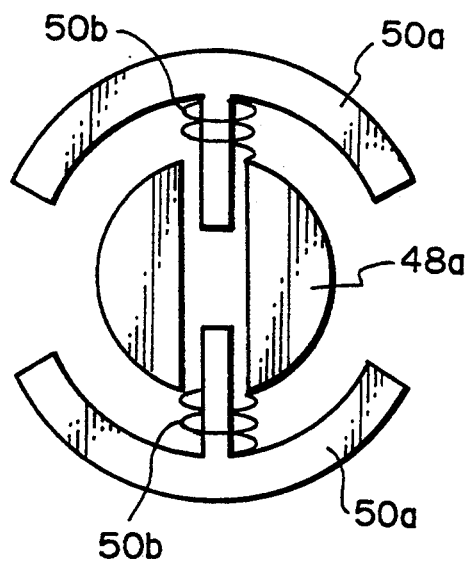
FIG. 17 is a view of the friction increasing means engaging with the guide groove.

As shown in FIG. 17, a friction increasing means is provided for ensuring that the slider 48 can stop at a desired position in the guide groove 46 and is maintained at that position unless a large force is applied to the keyboard portion 26. The friction increasing means comprises a plurality of slide pieces 50a radially movably carried by the slider 48 and having an arcuate shape to be engaged with the surface of the guide groove 46, and springs 50b for outwardly biasing the slide pieces 50a to urge the slide pieces 50a to the surface of the guide groove 46 and to increase the friction of the slide pieces 50a to the surface of the guide groove 46. The slider 48 has a shaft portion 48a in which radial holes are arranged and each of the slide pieces 50a has a stem which is slidably inserted in each of the radial holes of the shaft portion 48a of the slider 48 to allow the slide pieces 50a to move like a piston. With this structural arrangement, it is possible for the keyboard portion 26 to stop at any position along the guide groove 46. It is, of course, possible to use the other arrangement for the friction increasing means.

As shown in FIG. 14, the guide groove 46 is tapered so that a front portion of the guide groove 46 is higher than a rear portion of the guide groove 46, and the tilting angle of the keyboard portion 26 changes in response to a degree of the drawing or pulling of the keyboard portion 26 from the base portion 12. The tilting angle of the keyboard portion 26 is highest when the keyboard portion 26 is at the position as shown in FIG. 14. FIG. 15 shows the keyboard portion 26 at a position in which the keyboard portion 26 is slightly pushed into the base portion 12, and the tilting angle of the keyboard portion 26 is slightly smaller than that shown in FIG. 14. In addition, when the keyboard portion 26 is used at the position shown in FIG. 15, the display of the display housing portion 22 becomes closer to the vertical. In this case, however, it is possible to select the tilting angle of the display of the display housing portion 22 by bending the top cover portion 16, to some extent, by the fourth hinge means 42.

Figure 18:
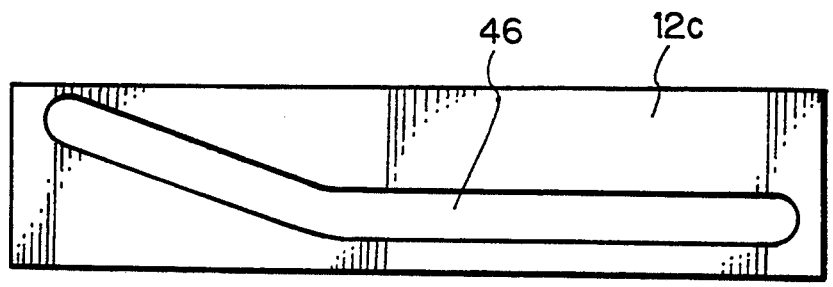
FIG. 18 is a view of the modified guide groove of the side wall of the base portion.
Figure 19:
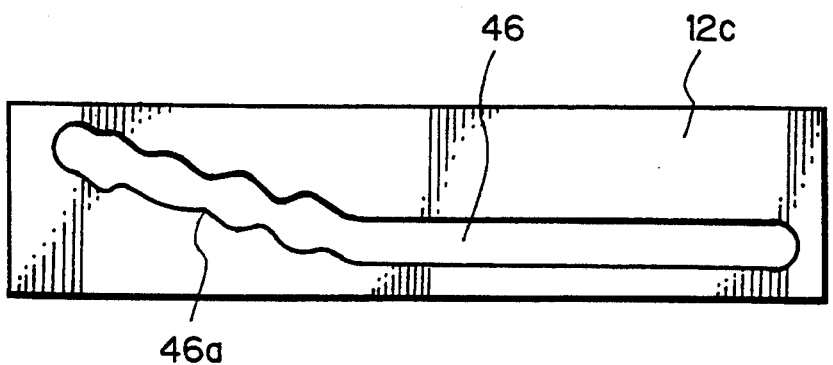
FIG. 19 is a view of the further modified guide groove of the side wall of the base portion.

FIGS. 18 and 19 show that the guide groove 46 is partly sloped. FIG. 19 further shows that the sloped portion of the guide groove 46 has a stop position deciding means 46a for deciding a predetermined stop position of the slider 48. The stop position deciding means 46a comprises a side wall structure of the guide groove 46 in a corrugated shape.

In these embodiments, it is possible to effectively adjust the tilting angle of the keyboard portion 26. In other words, as in the examples shown in FIGS. 14 and 15, the guide groove 46 is constantly sloped from the rear to the front, and the height of the slider 48, that is, the height of the rear end of the keyboard portion 26 becomes higher and thus the tilting angle of the keyboard portion 26 becomes greater as the slider 48 comes closer to the front end of the base portion. However, the display housing portion 22 does not stand up to the vertical until the keyboard portion 26 is drawn approximately halfway of the guide groove 46. Therefore, regarding the adjustment of the tilting angle of the keyboard portion 26, it can be said that the fully sloped guide groove 46 plays only one half of its role.

In the embodiments of FIGS. 18 and 19, the guide groove 46 is sloped along one front half of its length so that the tilting angle of the keyboard portion 26 can be adjusted widely. In this manner, when the keyboard portion 26 is drawn the half of its length so that the slider 48 reaches the sloped portion of the guide groove 46, the display housing portion 22 stands up substantially to the vertical, by which the data processing apparatus 10 is brought into a substantially use position. By further drawing the keyboard portion 26, the tilting angle of the keyboard portion 26 becomes greater, with the result that the range of the adjustment of the tilting angle of the keyboard portion 26 is approximately the twice of that of the previous embodiments.

In FIG. 19, that the sloped portion of the guide groove 46 has a stop position deciding means 46a for deciding a predetermined stop position of the slider 48, comprising a side wall structure of the guide groove 46 in a corrugated shape. That is, in the structural arrangement shown in FIG. 18, for example, when the slider 48 stops at a position along the sloped portion of the guide groove 46, the slider 48 is maintained in position only by the friction or the friction increasing means provided in the slider 48, and there is a possibility that the keyboard portion 26 may move from that position if an external force applied to the keyboard portion 26 while the keyboard portion 26 is operated. In the structural arrangement shown in FIG. 19, since the stop position deciding means 46a in the corrugated shape is provided, an unexpected movement of the keyboard portion 26 is prevented. It is noted that the above-described structural arrangement is not limited to the stop position deciding means 46a being of the corrugated shape, and the position deciding means can take any shape (such as, a triangular shape, a quadrangular shape, a polygonal shape, or projections). It is also possible to arrange the stop position deciding means 46a in only one side of the guide groove 46.

Figure 20:
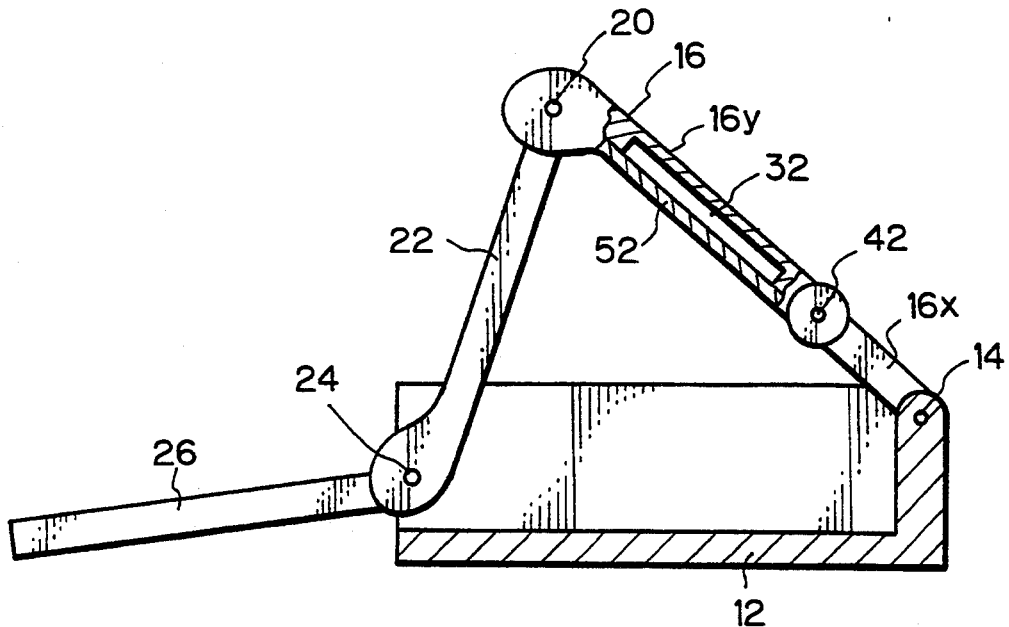
FIG. 20 is a side cross-sectional view of the apparatus according to the sixth embodiment of the present invention.

FIG. 20 shows the sixth embodiment of the present invention. The portable data processing apparatus 10 of this embodiment comprises, similar to the previous embodiments, a base portion 12 adapted to be rested on a support surface, a top cover portion 16 pivotally connected to the base portion 12 by a first hinge means 14, a display housing portion 22 having a display and pivotally connected to the top cover portion 16 by a second hinge means 20, and a keyboard portion 26 pivotally connected to the display housing portion 22 by a third hinge means 24. Also, the top cover portion 16 comprises a first part 16x and a second part 16y pivotally connected to the first part 16x by the fourth hinge means 42.

Figure 21:
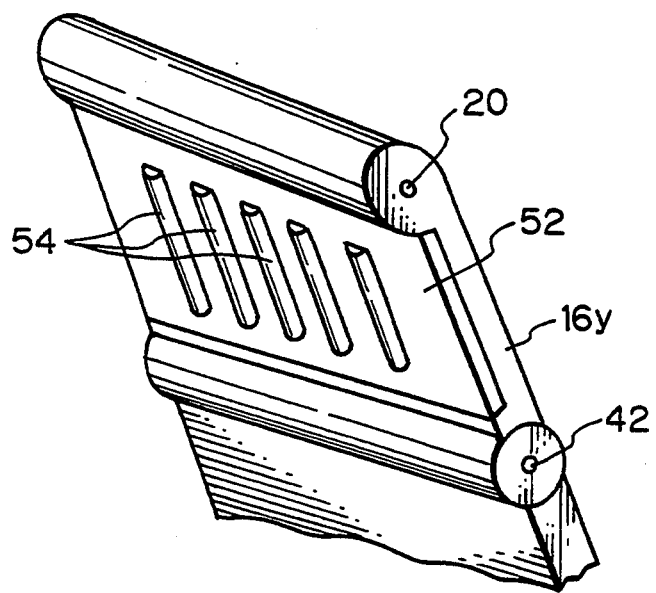
FIG. 21 is a partial perspective view of the top cover portion including the protective cover.

In this embodiment, the top cover portion 16 includes a main printed wiring board 32 including a main control circuit with a central processing unit (CPU) for data processing. The main printed wiring board 32 is located in the top cover portion 16 at such a position so as to avoid the fourth hinge means 42, and preferably in the second part 16y of the top cover portion 16 between the fourth and second hinge means 42 and 20. The wirings or cables (see FIG. 7) connects the main printed wiring board 32 to the electric components, such as, a printed wiring board in the display housing portion 22. The main advantage of this arrangement is that the length of the wirings or cables connecting the main printed wiring board 32 to the electric components in the display housing portion 22 can be shortened (FIG. 21). It will be clear from the description of FIGS. 7 to 9 that the wirings extends from the front end of the top cover portion 16 to the rear end of the display housing portion 22 at a position other than a position where the second hinge means 20 is located.

Recently, with the high-density developments in semiconductor devices, there is a tendency for CPUs and peripheral control circuits constituting the heart of the data processing apparatuses (such as, personal computers and wordprocessors) to be made in much smaller shapes, and the data processing apparatuses can be designed in a compact shape. However, heat generated by the semiconductor devices is not reduced as much as the size of the semiconductor devices, and in the design of the data processing apparatuses, radiation of heat from the apparatuses is an important problem to be considered. This embodiment is expected to solve this problem.

By using a surface mounting technique to mount the main printed wiring board 32 in the data processing apparatus, or a tape automated bonding technique (TAB) in which a non-molded, naked semiconductor element is used, it is possible to prepare the main printed wiring board 32 having a thickness of less than 2 millimeters, and thus, to arrange the main printed wiring board 32 on the inside of the top cover portion 16. According to the present invention, it is possible to attain a very effective radiation of the heat from the apparatus because the top cover portion 16 and the display housing portion 22 stand up during use; and the main printed wiring board 32 arranged inside the top cover portion 16 is exposed to the air while the apparatus is supplied with the electric current. In the case of actually sold data processing apparatus, it will not be possible to directly expose the main printed wiring board 32 to the ambient air, but it will be possible to expose the main printed wiring board 32 to the ambient air via a protective cover to radiate the heat and to obtain a similar effect to direct exposure.

FIGS. 20 and 21 show that the main printed wiring board 32 is accommodated in a recess in the inner surface of the top cover portion 16 and covered by a protective cover 52. The protective cover 52 can include radiating fins 54 for an effective heat radiation. The protective cover 52 can be made metal such as aluminum or heat conductive plastic having silica or the like mixed therein. The protective cover 52 can be used as an electro-magnetic shield element. When the protective cover 52 is made from plastic, it is possible to plate a metal film on the plastic.

Figure 22:
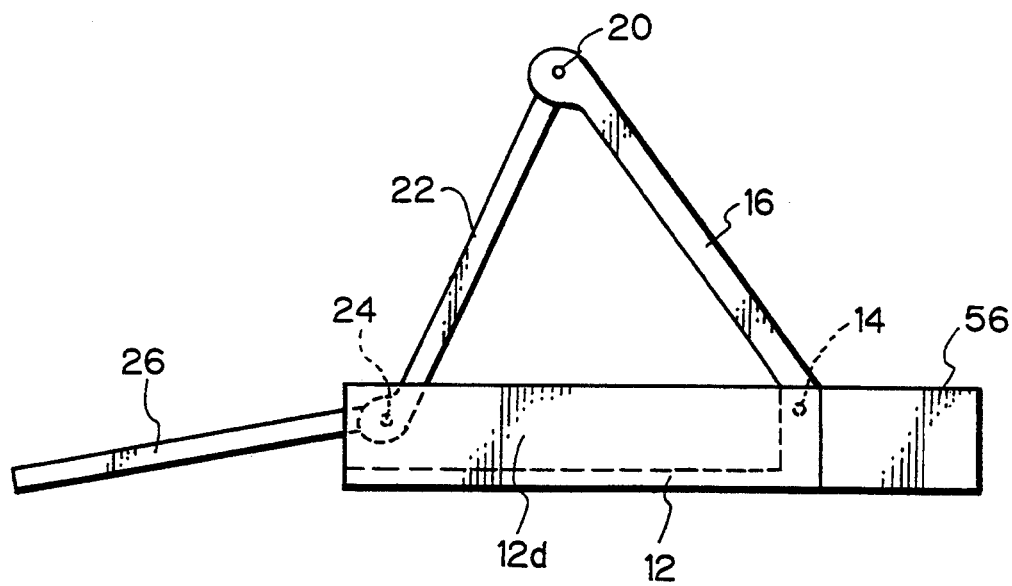
FIG. 22 is a side cross-sectional view of the apparatus according to the seventh embodiment of the present invention.

FIG. 22 shows the seventh embodiment of the present invention. In this embodiment, the first hinge means 14 is located at an intermediate position between the front and rear ends of the base portion 12, and thus the base portion 12 comprises a first part in front of the first hinge means 14 and a second part behind first hinge means 14. The first part accommodates the keyboard portion 26 and the display housing portion 22 in the retracted position, as described above, and the second part constituting a further housing 56 for other electric components such as a battery and connectors.

In data processing apparatuses, a primary battery such as a manganese dry battery or a secondary battery such as a nickel-cadmium battery is used to provide operating power. These batteries generally have a cylindrical shape with certain exceptions, and the dry battery of the AA size has a diameter of approximately 14 millimeters. In the main structure of the present invention, the base portion 12, the top cover portion 16, the display housing portion 22 and the keyboard portion 26 overlap one above another, and it is difficult to provide a space to house the battery of the often used AA size if the top cover portion 16 is pivotally connected to the rear end of the base portion 12.

In the embodiment of FIG. 22, this problem is solved by arranging the additional housing 56 behind the first hinge means 14 for accommodating electric components (such as, batteries or other components) having a substantial height. In some types of portable data processing apparatuses, it is necessary to provide an interface for delivering internal signals to an external equipment, and in this case, it is possible to accommodate other electric components (such as, connectors) in the additional housing 56.

The height of the additional housing 56 is preferably substantially identical to the height of the top cover portion 16 from the base portion 12 in the retracted position. It is, of course, not always necessary for the height of the additional housing 56 to be identical to the height of the apparatus 10; and the additional housing 56 can have a different height from that of the apparatus 10 in accordance with a design or a functional need.

Figure 25:
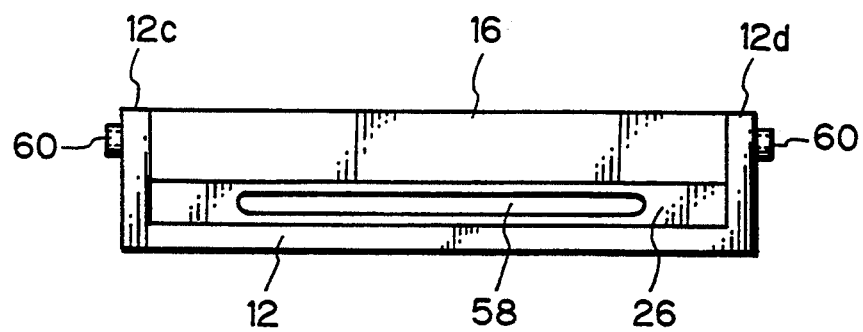
FIG. 25 is a front view of the apparatus of FIG. 23.
Figure 23:
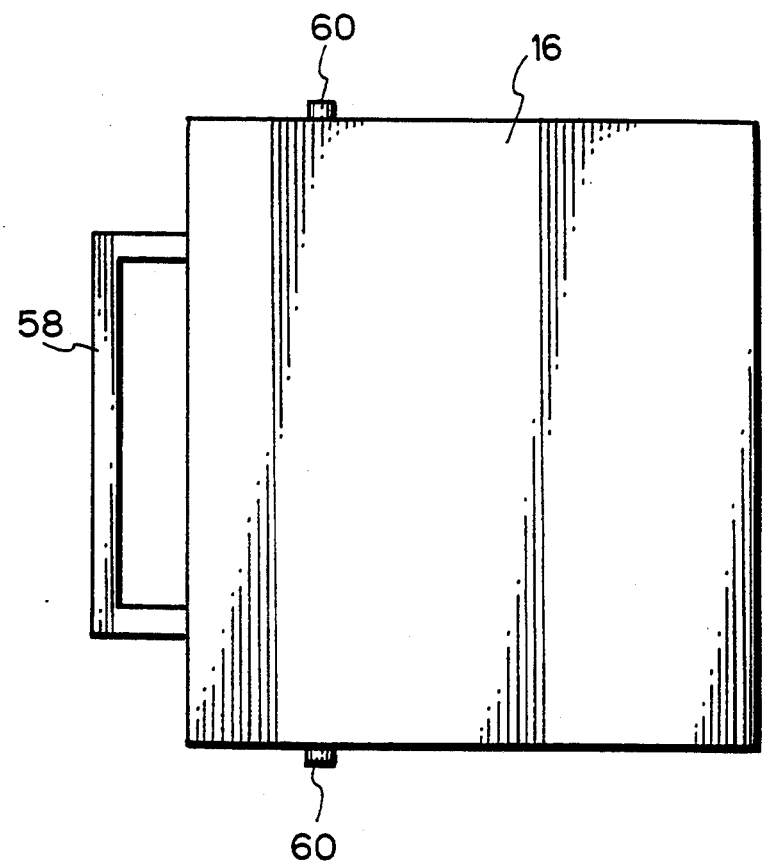
FIG. 23 is a plan view of the apparatus according to to the eighth embodiment of the present invention.
Figure 24:
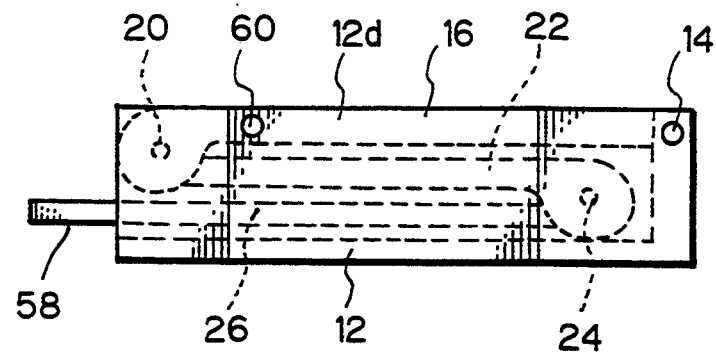
FIG. 24 is a side view of the apparatus of FIG. 23.

FIGS. 23 to 25 show the eighth embodiment of the present invention. In this embodiment, a handle 58 is attached to the front end of the keyboard portion 26 for transporting the apparatus 10.

The handle 58 is also used to bring the apparatus 10 from the retracted position to the spread use position by pulling the handle 58 to draw the keyboard portion 26 and the display housing portion 22, and the top cover portion 16. By this feature, it is possible to quickly and smoothly bring the apparatus 10 from the retracted position to the spread (use) position. Also, by pushing the handle 58 from the spread position, it is possible to fold the keyboard portion 26 and the display housing portion 22, and the top cover portion 16 into the retracted position. The handle 58 can be fixedly attached to the front end of the keyboard portion 26, but alternatively, the handle 58 can be pivotally attached to the front end of the keyboard portion 26 to allow a person to comfortably carry the apparatus 10 or to comfortably draw the keyboard portion 26.

The conventional data processing apparatus is generally provided with a handle for transportation which is attached to the base portion of the apparatus. According to the present invention, by arranging the handle 58 on the front end of the keyboard portion 26, the handle 58 can be used not only for the transportation purpose but also for drawing the keyboard portion 26 from the retracted position to the spread position.

In addition, a locking means is provided for preventing the apparatus 10 from being accidentally brought from the retracted position to the spread position. Consequently, in the apparatus 10 of the present invention, it is desirable to firmly hold a portion of the apparatus near the second hinge means 20 in the retracted position. In this embodiment, tabs (sliders) 60 are provided on the outer surfaces of the side walls 12c and 12d of the base portion 12 near the second hinge means 20.

Figure 26:
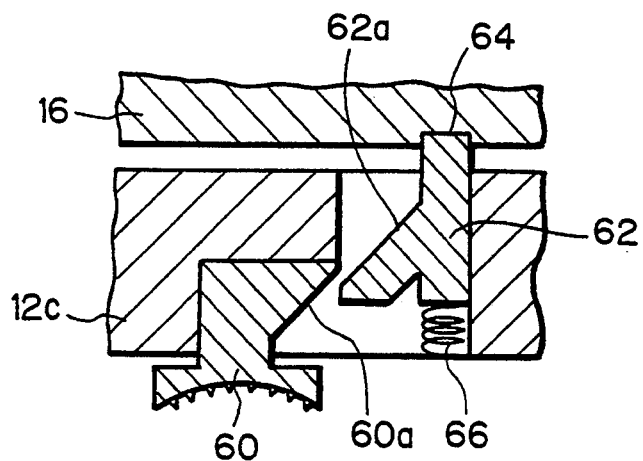
FIG. 26 is a cross-sectional view of the lock means of FIG. 23.
Figure 27:
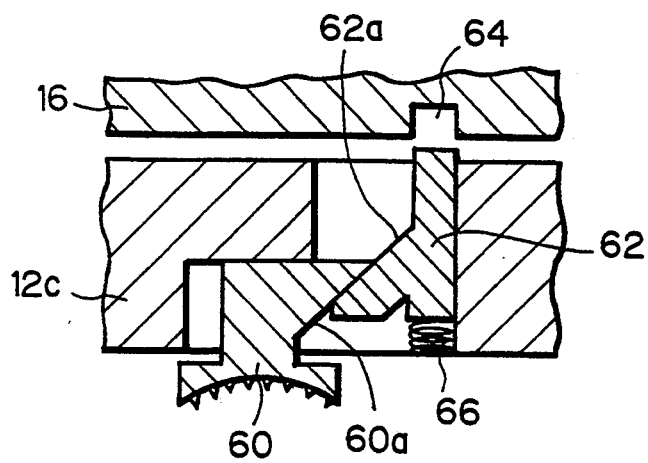
FIG. 27 is a cross-sectional view of the lock means of FIG. 26 when it is opened.

As shown in FIGS. 26 and 27, a movable projections 62 are provided on the side walls 12c and 12d of the base portion 12 for cooperation with the tabs 60, and each of the movable projections 62 engages in a recess 64 arranged in the top cover portion 16. Each of the tabs 60 has a slope 60a of 45 degrees and each of the movable projections 62 has a slope 62a of 45 degrees for slidable engagement with the slope 60a. Each of the movable projections 62 is also biased toward the recess 64 by a spring 66.

The tabs 60 are guided so that they can move along the outer surfaces of the respective side walls 12c and 12d of the base portion 12; and the movable projections 62 are guided so that they can move perpendicular to the outer surfaces of the respective side walls 12c and 12d of the base portion 12.

Therefore, as shown in FIG. 26, when the tab 60 is in the left position in FIG. 26, and thus the slope 60a does not contact the slope 62a, the movable projection enters the recess 64 of the top cover portion 16 by action of the spring 66, to lock the top cover portion 16 to the base portion 12. Therefore, it is possible to hold the apparatus 10 in the retracted position.

Figure 28:
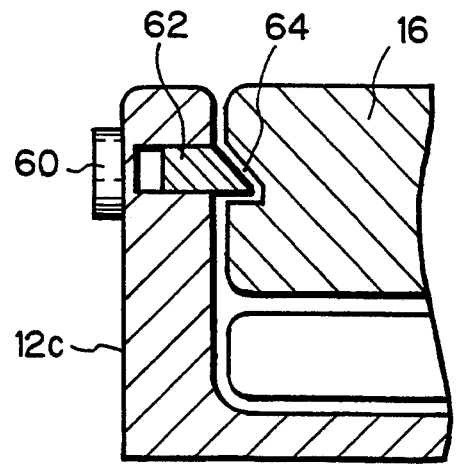
FIG. 28 is a cross-sectional view of the apparatus of FIG. 26, taken through perpendicular to the plane of FIG. 26.

When using the apparatus 10, the tab 60 is moved to the right by the finger, as shown in FIG. 27. Then, the movement of the tab 60 causes the movable projection 62 to outwardly move via the slopes 60a and 62a; and the movable projection 62 comes out of the recess 64 to release the lock. When the finger is released from the tab 60, the lock arrangement returns to the condition of the FIG. 26. In addition, as shown in FIG. 28, the movable projection 62 has a wedge-like tapered edge to facilitate the entry of the movable projection 62 into the recess 64. Thus, when the apparatus 10 is closed after the use, and the top cover portion 16 is lowered toward the base portion 12, the top cover portion 16 contact the tapered edge of the movable projection 62 to push back the movable projection 62 and then the movable projection 62 enters the recess 64. It will be apparent that the lock can be provided in the display housing portion 22, in place of the top cover portion 16.

The present invention has been described above with reference to several embodiments, but it will be understood that the present invention is not limited to the illustrated embodiments but it is possible to make a variety of modifications, for example, to the details of the structure of the hinge means within the scope of the invention.

We claim:

1. A portable data processing apparatus, comprising:
   a base rested on a support surface, and having a front and a rear;
   a top cover pivotally connected to said base by a first hinge means;
   a display housing having a display, and pivotally connected to said top cover by a second hinge means; and
   a keyboard pivotally connected to said display housing by a third hinge means,
   wherein said first, second and third hinge means include respective hinge axes parallel to each other so that said apparatus can adopt a spread position in which said keyboard portion and said display housing portion are spread to the front with said third hinge means moved away from said first hinge means, and a retracted position in which said keyboard overlaps said display housing with said third hinge means moved close to said first hinge means.

2. An apparatus according to claim 1, wherein said base, said top cover, said display housing and said keyboard have generally flat shapes and can be collapsed in a face-to-face relationship in said retracted position.

3. An apparatus according to claim 1, wherein said top cover, said display housing and said keyboard have respective first and second ends, said first end of said top cover being pivotally connected to said base at a position remote from said front, said second end of said top cover being pivotally connected to said first end of said display housing, said second end of said display housing being pivotally connected to said first end of said keyboard.

4. An apparatus according to claim 3, wherein said base has a first end on the front side and a second end on the rear side, and said first end of said top cover is pivotally connected to said second end of said base.

5. An apparatus according to claim 4, wherein said base comprises a first part in front of an intermediate portion and a second part behind said intermediate position, said first part accommodating said keyboard and said display housing in said retracted position, wherein said second part includes another housing for other electric components, wherein one of said electric components is at least one of a battery and a connector.

6. An apparatus according to claim 5, wherein said another housing has a height substantially identical to a height of said top cover of said base in said retracted position.

7. An apparatus according to claim 3, wherein said base has a first end on the front side and a second end on the rear side, and said first end of said top cover is pivotally connected to an intermediate position of said base between said first and second ends.

8. An apparatus according to claim 3, wherein said base includes a main printed wiring board having a main control circuit for data processing and said display housing includes electronic components for displaying, wiring means extending from said main printed wiring board through said top cover to said electronic components to interconnect said main printed wiring board to said electronic components.

9. An apparatus according to claim 8, wherein said wiring means extends from said second end of said top cover to said first end of said display housing at a position other than a position where said second hinge means is located.

10. An apparatus according to claim 3, wherein at least one of said first, second and third hinge means comprises a cylindrical projection arranged in one of the pivotally connected portions and a cylindrical cavity arranged in the other of the pivotally connected portions and adapted to be fitted with said cylindrical projection.

11. An apparatus according to claim 1, wherein said top cover comprises a first part and a second part pivotally connected to said first part by a fourth hinge means having a pivot axis parallel to said pivot axis of said first hinge means.

12. An apparatus according to claim 11, further comprising a friction increasing means, within said fourth hinge means, for ensuring that said first and second parts are maintained at a desired angular relationship.

13. An apparatus according to claim 2, wherein said base comprises a flat base wall, and side walls standing on the base wall so that said keyboard and said display housing are housed between said side walls in said retracted position.

14. An apparatus according to claim 13, wherein said keyboard has a slider which can slide along at least one of said side walls of said base in the direction from said front to the rear or from the rear to the front.

15. An apparatus according to claim 14, wherein at least one of said side walls of said base has a guide groove, and wherein said slider of said keyboard slidably engages with the guide groove.

16. An apparatus according to claim 15, further comprising a friction increasing means, operably coupled to said slider, for ensuring that said slider can stop at a desired position in the guide groove and is maintained at that position unless a large force is not applied to said keyboard.

17. An apparatus according to claim 16, wherein said friction increasing means comprises at least one slide piece radially movably carried by said slider and having an arcuate shape to be engaged with said guide groove, and a spring for outwardly biasing said slide piece to urge said slide piece to said guide groove.

18. An apparatus according to claim 17, wherein said guide groove has an at least partly sloped portion so that a front portion of said guide groove is higher than a rear portion of said guide groove.

19. An apparatus according to claim 18, wherein said guide groove includes, at a sloped portion thereof, a stop position deciding means for deciding a predetermined stop position of said slider.

20. An apparatus according to claim 19, wherein said stop position deciding means comprises a side wall structure of said guide groove in a corrugated shape.

21. An apparatus according to claim 3, wherein said top cover includes a main printed wiring board which includes a main control circuit for data processing, and wherein said display housing includes electronic components for displaying, wiring means extending from said main printed wiring board to said electronic components.

22. An apparatus according to claim 21, wherein said wiring means extends from said second end of said top cover to said first end of said display housing at a position other than a position where said second hinge means is located.

23. An apparatus according to claim 21, wherein said top cover includes a protective cover attached to said top cover for covering said main printed wiring board, said top cover radiating heat generated by said main printed wiring board.

24. An apparatus according to claim 23, wherein said protective cover includes radiating fins for an effective heat radiation.

25. An apparatus according to claim 23, wherein said protective cover is made from one of metal and heat conductive plastic.

26. An apparatus according to claim 21, wherein said top cover comprises a first part and a second part pivotally connected to said first part by a fourth hinge means having a pivot axis parallel to said pivot axis of said first hinge means, said main printed wiring board being arranged in at least one of said first and second parts.

27. An apparatus according to claim 1, wherein said keyboard includes a handle at a second end thereof for transporting said apparatus.

28. An apparatus according to claim 27, further comprising a locking means, engageable with said top cover, for preventing said apparatus from being accidentally brought from said retracted position to said spread position.

29. An apparatus according to claim 28, wherein said locking means is located near said second hinge means connecting said top cover to said display housing.

30. An apparatus according to claim 29, wherein said locking means comprises a movable projection arranged at a side wall of said base, and a recess arranged in one of said top cover and said display housing to engage with said movable projection.

31. An apparatus according to claim 30, wherein said movable projection is actuated by a tab movable perpendicular to a moving direction of said movable projection.

* * * * *